United States Patent [19]
Sandstrom

[11] Patent Number: 5,440,578
[45] Date of Patent: Aug. 8, 1995

[54] GAS REPLENISHMENT METHOD AND APPARATUS FOR EXCIMER LASERS

[75] Inventor: Richard L. Sandstrom, Encinitas, Calif.

[73] Assignee: Cymer Laser Technologies, San Diego, Calif.

[21] Appl. No.: 93,353

[22] Filed: Jul. 16, 1993

[51] Int. Cl.⁶ .............................................. H01S 3/22
[52] U.S. Cl. ........................................ 372/59; 372/57; 372/58; 372/60
[58] Field of Search ...................... 372/55, 57, 58, 59, 372/60

[56] References Cited

U.S. PATENT DOCUMENTS

| | | | |
|---|---|---|---|
| 3,745,482 | 7/1973 | Patel | 372/60 X |
| 4,134,083 | 1/1979 | Sasnett et al. | 372/60 X |
| 4,722,090 | 1/1988 | Haruta et al. | 372/59 X |
| 4,888,786 | 12/1989 | Davis et al. | 372/58 |
| 4,959,840 | 9/1990 | Akins et al. | 372/57 |
| 5,025,445 | 6/1991 | Anderson et al. | 372/20 |
| 5,073,896 | 12/1991 | Reid et al. | 372/59 |
| 5,090,020 | 2/1992 | Bedwell | 372/59 |
| 5,142,543 | 8/1992 | Wakabayashi et al. | 372/59 X |

Primary Examiner—Rodney B. Bovernick
Assistant Examiner—Hemang Sanghavi
Attorney, Agent, or Firm—Blakely, Sokoloff, Taylor & Zafman

[57] ABSTRACT

An excimer gas laser using a fluorine/krypton/neon gas mixture is provided with separate fluorine/krypton/neon and krypton/neon gas sources for use in replenishing the gas mixture. A bleed-down mechanism is also provided for draining a portion of the gas mixture from the excimer laser. A control mechanism controls operation of the separate fluorine/krypton/neon and krypton/neon sources and the bleed-down mechanism to selectively vary the gas mixture within the excimer laser to maintain an overall optimal laser efficiency. Preferably, the control system monitors operational parameters of the excimer laser including gain, wavelength, bandwidth and pulse rate, to determine whether the gas mixture within the excimer laser may have changed from an optimal mixture. The control system controls operation of the separate fluorine/krypton/neon and krypton/neon sources to compensate for changes in the operation parameters of the laser to thereby maintain high overall laser efficiency. Alternatively, gas replenishment is controlled subject to predetermined empirically-based gas replenishment strategies.

20 Claims, 2 Drawing Sheets

GAS REPLENISHMENT METHOD AND APPARATUS FOR EXCIMER LASERS

BACKGROUND OF THE INVENTION

1. Field of the Invention

The invention generally relates to gas lasers and, in particular, relates to methods and apparatus for replenishing gas mixtures within an excimer gas laser.

2. Description of Related Art

Many gas lasers, particularly excimer lasers, maintain a mixture of two or more gasses in a discharge chamber for use in generating a laser beam. A typical excimer laser for example may include a gas mixture composed of fluorine, krypton, and neon. The efficiency of the laser depends, in part, on the particular composition of the gas mixture. A deviation from an optimal composition may decrease the efficiency of the laser, thereby resulting in an output beam of less power. Moreover, a non-optimal gas composition may affect the ability of the laser to maintain a desired output frequency or to maintain a desired pulse rate. A substantial deviation in the gas mixture from an optimal mixture may also affect the durability and reliability of the laser, including causing an increase in corrosion or wear within the laser itself.

The composition of the gas mixture may change as a function of time depending upon several factors. In particular, for fluorine/krypton excimer lasers, the amount of fluorine tends to be depleted while the excimer laser is operated. Fluorine, being a highly reactive halogen, tends to react with materials within the excimer laser by an amount sufficient to lower the amount of fluorine relative to krypton.

For example, a typical fluorine/krypton excimer laser may include a gas mixture composed of 0.1 percent fluorine, 1.0 percent krypton, and 98.9 percent neon. During operation of the excimer laser, fluorine becomes depleted thereby changing the relative compositions described above. The krypton and neon components, being substantially non-reactive noble gasses, are not as significantly depleted as the fluorine.

On possible way to correct for depletion of the fluorine in the laser mix is to completely replace the laser mix with a fresh fill containing the correct relative concentrations of gasses. Although a complete replacement of the gas mixture is an effective way to compensate for a deviation in the relative composition of the gasses, such is not a particularly cost effective or efficient method for compensating for gas depletion. Indeed, excimer laser pre-mixes have become quite expensive and, particularly for large scale excimer lasers having considerable gas chamber volume, the cost of completely flushing the gas chamber and replacing it with new gas can be substantial.

Accordingly, methods have been proposed for compensating for gas component depletion without requiring a complete replacement of the gas mixture. To this end, some fluorine/krypton excimer lasers are provided with a means for adding fluorine to an existing gas mixture, without requiring complete replacement of the gas mixture. During normal operation only fluorine is depleted. Hence, it would be simplest to add only fluorine. However, fluorine is extremely reactive and dangerous. Accordingly, the fluorine must be diluted, typically by neon. Hence, a fluorine source having fluorine diluted by neon (typically 1.0% fluorine) is provided for replenishing depleted fluorine. The fluorine/neon mixture is pumped into the gas chamber in an attempt to compensate for depleted fluorine. With such a technique, the period between complete replacement of the gas mixture can be extended substantially and the overall cost effectiveness of the excimer laser system is improved. However, by providing a replenishment source which includes a mixture of fluorine and neon, the pressure of the laser gas mix will steadily rise due to the addition of neon. Bleed-down is required when the addition of the fluorine/neon gas mixture increases the overall pressure within the chamber above a desired amount, and a portion of the gas mixture must be released to lower the pressure. When the gas pressure is lowered during bleed-down, some amount of krypton is lost. As the cycles of gas injection and bleed-down proceed, the concentration of krypton drops steadily, impairing the efficiency of the laser.

SUMMARY OF THE INVENTION

An object of the invention is to provide a method and apparatus for avoiding the depletion of krypton which occurs during injection/bleed cycles used to replenish fluorine consumed during operation of a fluorine/krypton excimer laser. In accordance with this object a method is provided for adding krypton to a fluorine/neon injection mixture whereby an amount of krypton lost during a bleed down operation is substantially replenished during a gas injection operation.

In a preferred embodiment, the invention provides a method for varying a gas mixture within a gas chamber of a gas laser, with said gas mixture including a halogen, a first noble gas and a second noble gas and with said gas mixture having a desired composition. The method comprises the steps of:

selectively pumping a halogen/first noble gas/second noble gags mixture into said chamber;

selectively pumping a first noble gas/second noble gas mixture into said chamber; and selectively releasing a portion of said gas mixture within said chamber;

with each of the foregoing steps performed by amounts sufficient to adjust an actual composition of said gas mixture within said chamber toward the desired composition.

In the preferred embodiment, the desired laser gas mixture is about 0.1 percent fluorine, 1.0 percent krypton, and 98.9 percent neon. Two source gas mixtures are used to achieve this mixture. The first source gas mixture contains 1 percent fluorine, 1 percent krypton, and 98 percent neon. The second source mixture contains only 1 percent krypton and 99 percent neon. During an initial fill of the laser, approximately 10 percent of the gas is provided by the first source mixture, and 90 percent by the second source mixture to achieve the desired laser gas mixture of about 0.1 percent Fluorine 1.0 percent krypton, and 98.9 percent neon.

When it is determined by suitable means that more fluorine must be added to replenish fluorine lost during operation of the laser, a quantity of the second mixture is pumped into the chamber. Periodically, although not necessarily after each injection, some gas is bled out of the chamber to reduce the overall pressure to the desired amount. By adding krypton as part of the injection mixture with a suitable fluorine/krypton ratio, the bleed-down process removes only as much krypton as was added during the injections. Hence, the concentration of krypton remains substantially constant.

In accordance with another embodiment of the invention an apparatus is provided for varying a gas mixture within a gas chamber of a gas laser, wherein the gas chamber contains a gas mixture including a halogen, a first noble gas and a second noble gas and wherein the gas mixture has a desired composition. The apparatus comprises:

first pump means for selectively pumping a halogen/first noble gas/second noble gas mixture into said chamber;

second pump means for selectively pumping a first noble gas/second noble gas mixture into said chamber;

bleed-down means for selectively releasing a portion of said gas mixture within said chamber; and control means for controlling operation of said first pump means, said second pump means and said bleed-down means to vary an actual gas composition within said gas chamber toward the desired composition.

In the preferred embodiment of the apparatus, means are provided for determining a difference between a desired composition and the actual composition of the gas mixture within the chamber. The determination means detects a change in operating efficiency of the excimer laser from a initial efficiency level. The control means may include an expert system which monitors changes in operational parameters of the laser to determine optimal gas mixture replenishment parameters, including when, and by how much, the gas mixtures are to be added to the chamber.

In both the method and apparatus of the invention, the provision of separate sources for fluorine/krypton/neon and krypton/neon allows depletion of krypton to be compensated for without requiring a complete replacement of the gas within the excimer laser. Furthermore, by providing a pair of gas sources in combination with a bleed-down capability, the actual composition of the gas mixture within the excimer laser can be varied in a refined and precise manner to maintain an optimal gas mixture composition for extended periods of time. Thus, the time period between complete flushing and replacement of the gas mixture is extended and the overall cost of gasses required for use in the chamber is minimized.

Thus, the general objects of the invention set forth above are achieved. Other objects and advantages of the invention will be apparent from the detailed description of the invention set forth below.

BRIEF DESCRIPTION OF THE DRAWINGS

The present invention will be understood more fully from the detailed description given below and from the accompanying drawings of the preferred embodiment of the invention in which.

DETAILED DESCRIPTION OF THE INVENTION

Figure 1:
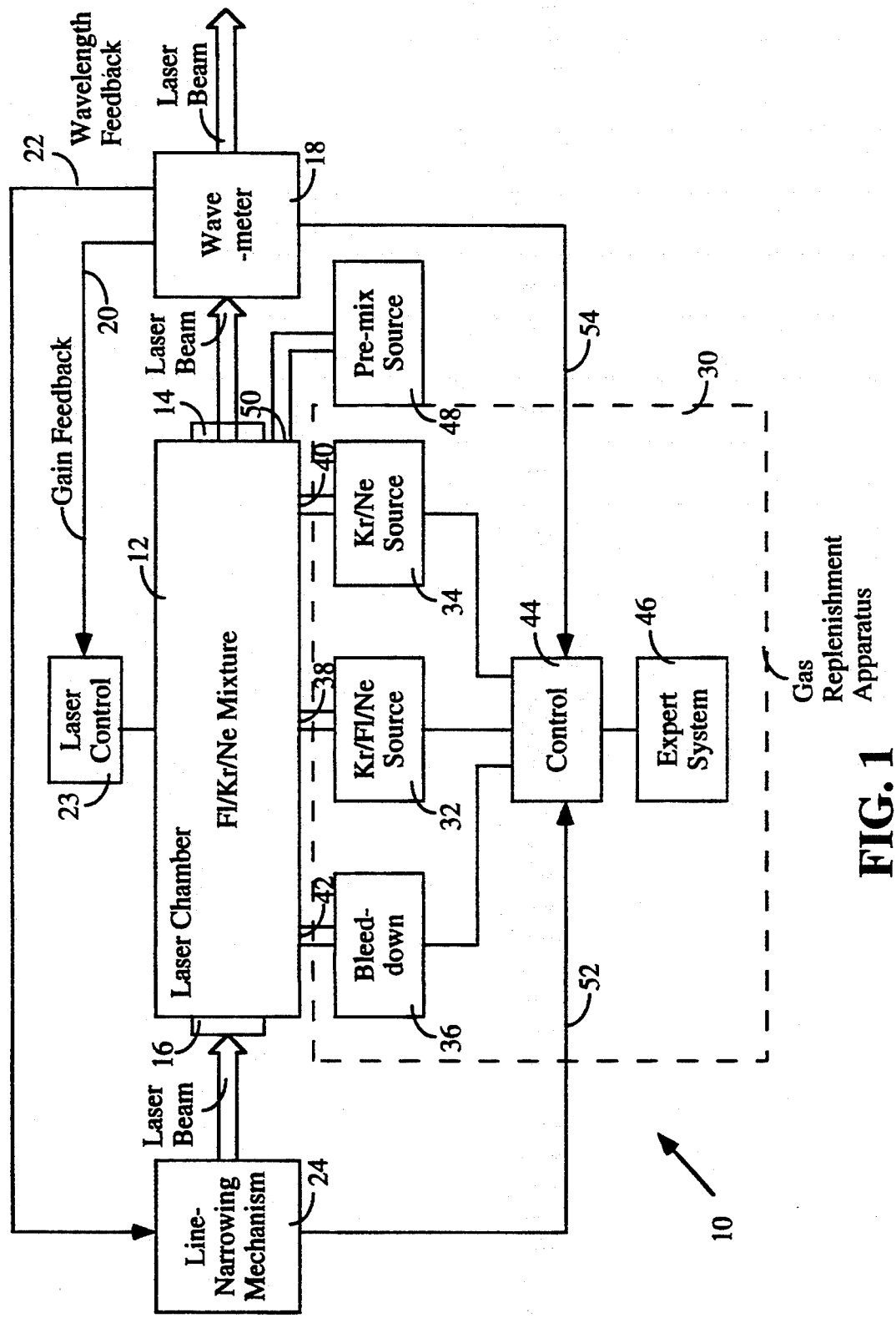
FIG. 1 is a block diagram, somewhat in schematic form, of an excimer laser provided with a gas replenishment apparatus in accordance with a preferred embodiment of the invention.
Figure 2:
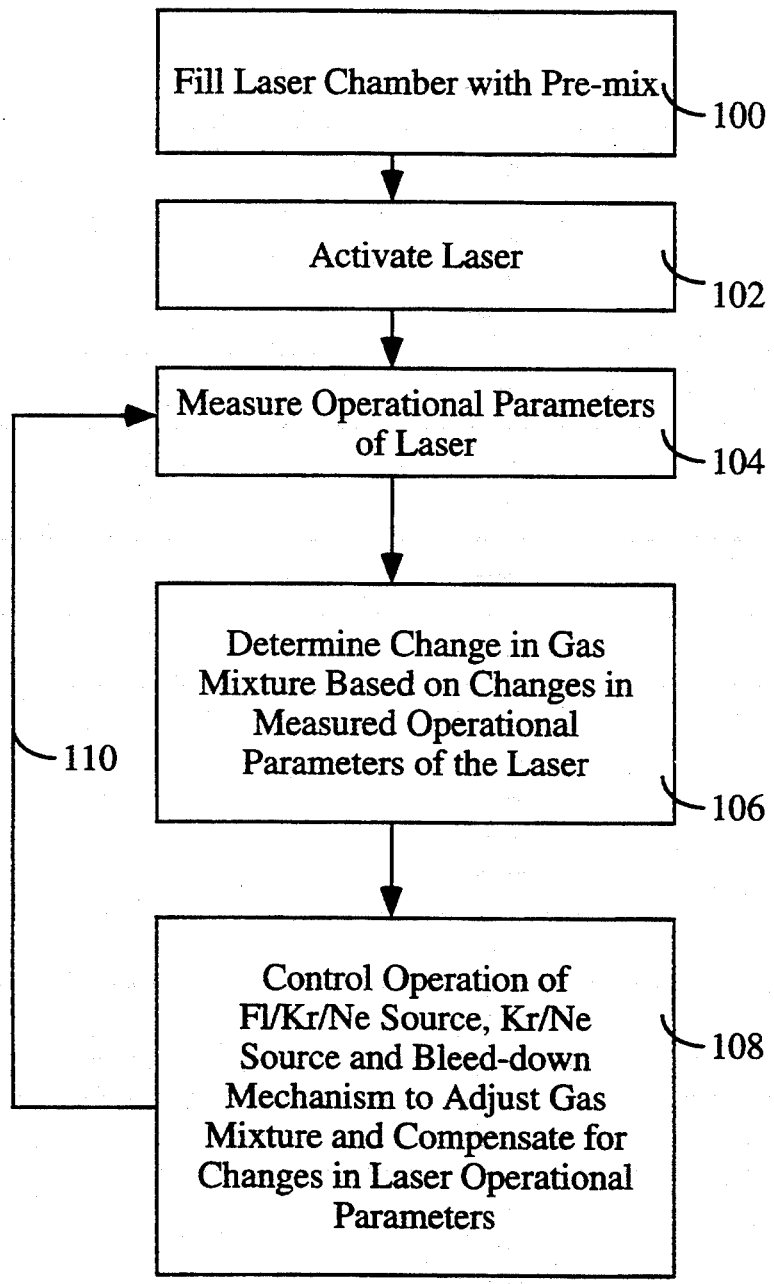
FIG. 2 is a block diagram illustrating a gas replenishment method, particularly for use with the excimer laser apparatus illustrated in FIG. 1.

Referring to FIGS. 1 and 2, preferred embodiments of the invention will now be described.

FIG. 1 illustrates a portion of an excimer laser 10 having a gas lasing chamber 12 filled with a mixture of fluorine, krypton and neon. A pair of windows 14 and 16 are provided on opposing ends of chamber 12 for emitting a coherent laser beam generated within chamber 12. A wave meter 18 is positioned adjacent to window 14 for receiving the laser beam transmitted through window 14. Wave meter 18 includes mechanisms for determining the precise wavelength and bandwidth of the laser beam emitted from chamber 12. Wave meter 18 also includes mechanisms for determining the power or energy of the laser beam. Wave meter 18 outputs signals representative of the energy and the wavelength along output lines 20 and 22 respectively. The energy signal, output along line 20, is received by a laser control mechanism 23. Laser control mechanism 22 controls operation of excimer laser 10 to adjust the energy of the laser beam generated within laser chamber 12. Laser control mechanism 23 also preferably operates to pulse the laser beam at a desired pulse rate.

The wavelength signal output from wave meter 18 along line 22 is received by a spectral-narrowing mechanism 24, which adjusts the wavelength of the laser beam generated within chamber 12. Thus, with the provision of wavemeter 18 and spectral-narrowing mechanism 24, the wavelength of the laser beam generated by excimer laser 10 may be controlled. Preferably, control mechanism 23 operates to pulse the laser beam generated within chamber 12 to achieve a pulsed, rather than a continuous, laser beam. The components of excimer laser 10, thus far described, may be of conventional design and fabrication and will not be described in further detail herein. However, a preferred excimer laser assembly is set forth in U.S. Pat. No. 4,959,840, entitled "Compact Excimer Laser Including an Electrode Mounted in Insulating Relationship to Wall of the Laser", assigned to the assignee of the present application. A preferred wave meter for use with the excimer laser is set forth in U.S. Pat. No. 5,025,445, entitled "System for, and Method of, Regulating the Wavelength of a Light Beam", also assigned to the assignee of the present application. U.S. No. 4,959,840 and U.S. Pat. No. 5,025,445 are both incorporated herein by reference.

In addition to the components thus far described, excimer laser 10 includes a gas replenishment apparatus, generally denoted 30. Gas replenishment apparatus 30 includes a fluorine/krypton/neon gas pump 32 a krypton/neon gas pump 34, and a bleed-down mechanism 36. Fluorine/krypton/neon gas source 32 is connected to chamber 12 via an input port 38. Fluorine/krypton/neon pump 32 includes appropriate mechanisms for pumping selected amounts of a fluorine/krypton/neon gas mixture into chamber 12. Krypton/neon gas pump 34 is connected to chamber 12 via an inlet port 40 and includes appropriate mechanisms for pumping a desired amount of krypton/neon gas mixture into chamber 12. Bleed-down mechanism 36 is connected to an output port 42 of chamber 12 and includes mechanisms for selectively releasing a desired amount of gas mixture from within chamber 12. A control mechanism 44 is connected to each of pumps 32 and 34 and bleed-down mechanism 36 for controlling operation thereof. Control mechanism 44 may include, as a component, an expert system 46 described below.

Preferably, chamber 12 is initially filled with a pre-mix of fluorine, krypton and neon, with the pre-mix having the composition of 0.1 percent fluorine, 1.0 percent krypton, and 98.9 percent neon, with the percentages based on partial pressure. A pre-mix source 48 is connected to chamber 12 through an inlet port 50 for initially filling chamber 12 with the pre-mix. Alternatively, a premix source need not be provided. Rather, chamber 12 can be initially filled using sources 32 and 34.

With the relative gas chamber mixture described above, excimer laser 10 preferably generates a laser beam having wavelength of 248 nano-meters. Wave meter 18 and line narrowing mechanism 24 operate in combination to maintain the wavelength of the laser beam at the desired wavelength of 248 nano-meters with a bandwidth of no more than 1 pico-meter (full-width half-maximum).

Although initially provided with a pre-mix having the precise composition noted above, the mixture within chamber 12 varies as a function of time while excimer laser 10 is operated. In particular, a portion of the fluorine is depleted during operation, possibly by reaction with other materials or compositions within laser chamber 12. The krypton and neon are also depleted, though to a lesser extent, during operation of the laser, perhaps by leakage from chamber 12. As a result, the relative composition of the mixture within chamber 12 varies as a function of time and can deviate, somewhat substantially, from the original pre-mix composition. A substantial variation from the composition of the gas mixture can affect the efficiency of the laser, including causing a general lowering in the laser gain and a deviation in the precise wavelength and bandwidth achievable. A variation in the composition may also affect the ability to pulse the laser beams at a desired rate. Replenishment apparatus 30 operates to maintain the composition within chamber 12 to that of the original pre-mix composition. In other words, replenishment apparatus 30 operates to replenish the fluorine, krypton and neon as they are depleted from the chamber.

The separate fluorine/krypton/neon and krypton/neon gas sources are provided to allow both fluorine and krypton to be effectively replenished within chamber 12. Fluorine/krypton/neon pump 32 provides a mixture of 1 percent fluorine, 1 percent krypton and 98 percent neon. Krypton/neon source 34 provides a mixture of 1 percent krypton and 99 percent neon. Bleed-down mechanism 36 allows a portion of the mixture within chamber 12 to be removed. In the alternate embodiment described above wherein a separate pre-mix source is not provided, chamber 12 can be initially filled by providing gas from sources 32 and 34 in the ratio of 1/9. In other words, by providing 10 percent of the initial gas from source 32 and 90 percent from source 34, a resulting mixture of 0.1 percent fluorine, 1.0 percent krypton and 98.9 percent neon is achieved.

As an example, should fluorine be depleted, fluorine/krypton/neon gas source 32 is controlled to add a desired amount of fluorine/krypton/neon to chamber 12 to increase the fluorine percentage therein. If, as a result, the overall pressure within chamber 12 exceeds a desired amount, excess gas may be removed from chamber 12 using bleed-down mechanism 36. Since krypton was present in the injected gas source 32 in substantially the desired concentration, any subsequent bleed-down will remove an equal quantity of krypton, thereby maintaining the correct krypton concentration at all times. In general, the operation of fluorine/krypton/neon source 32, krypton/neon source 34 and bleed-down mechanism 36 is controlled to maintain the mixture as close to the original pre-mix composition as possible. Also, in general, the ratios of the gasses within source 32 and source 34 can be selected to compensate for different depletion rates of the component gasses. In addition to toggling operation of the pump and bleed-down mechanisms, control mechanisms 44 may also control the rate by which gasses are exchanged with chamber 12. In this regard, gas flow regulators, not shown in FIG. 1, may be employed for controlling the flow rate of gasses into and out of chamber 12.

To automatically control operation of pumps 32 and 34 and bleed-down mechanism 36, control mechanism 44 receives signals from energy monitor and wave meter 18 along signal lines 54. From signals received along this line, control mechanism 44 determines the extent to which the various gas mixture components have been depleted and controls pumps 32 and 34 and bleed-down mechanism 36 accordingly to compensate for depletion. Although laser energy, wavelength, and bandwidth are exemplary parameters from which control mechanism 44 determines deviations within the gas mixture, other parameters may also be employed including the pulse rate of the laser, the temperature, the pressure of the laser chamber and other general operational parameters as well. The various laser operational parameters such as energy, wavelength, band-width and the like together define an overall laser "efficiency". The relationship of the gas chamber composition to the various operational parameters is determined in advance by empirical methods. In other words, the gas mixture is selectively varied in accordance with changes in the operational parameters to determine effective strategies for compensating for changes in the parameters. Strategies which are unsuccessful are discarded. Strategies which prove to be successful are incorporated into logic in control unit 44. For example, if it is determined that a substantial drop in the energy of the laser is usually a result of fluorine depletion, then such a relationship is programmed within the logic of control unit 44, which operates to add fluorine in response to a drop in laser energy.

Control mechanism 44 is preferably a programmable computer provided with software and databases providing logic necessary for controlling operation of the pumps and bleed-down mechanisms in response to changes in operational parameters. Preferably, the programs and databases include an expert system 46, which maintains a history of excimer laser 10 and, based on prior experience, controls operation of the pump and bleed-down mechanisms in an optimal manner. Expert system 46 preferably maintains a database containing a history of the operational parameters of the system as a function of time as well as a history of the control of the pump and the bleed-down mechanisms. In this manner, and with appropriate programming, expert system 46 determines to how best to control operation of the pumps and bleed-down mechanisms to compensate for undesirable changes in the operation parameters of the laser.

Although a programmed control mechanism having an expert system is a preferred mechanism for controlling the operation of the pumps and the bleed-down mechanism, such is not required. As an alternative, no automatic control mechanism is provided. Rather, the pumps and bleed-down mechanisms are manually controlled by an operator in response to changes in operational parameters detected by the operator using the appropriate sensors, not shown. Furthermore, although the control mechanisms are preferably operated in response to changes in laser parameters detected by various sensors, such is not required. Rather, the pumps and depletion mechanism may be controlled simply based on previously defined control strategies. For example, if it is determined that fluorine and krypton are always depleted by certain amounts during operation of the laser, then pumps 32 and 34 and depletion mechanism 36 may be controlled in accordance with a predetermined strategy for maintaining the fluorine and krypton levels without actually monitoring the operation of laser 10.

Furthermore, although it is anticipated that no mechanism for directly measuring the relative compositions within chamber 12 is employed, such a mechanism could well be provided, eliminating the need to determine changes in the gas mixture from changes in operational parameters of the laser. In such a circumstance, control system 44 merely monitors the actual measured composition of gasses within chamber 12 and controls pumps 32 and 34 and bleed-down mechanism 36 appropriately to compensate for any variation in the mixture.

Furthermore, although it is anticipated that pre-mix source 48 provides an optimal composition of gasses, such need not be the case. If it is determined that the pre-mix composition is non-optimal, control mechanism 44 may control the pumps and bleed-down mechanism in a manner to achieve an optimal mixture which differs from the pre-mix. For example, if it is determined that the pre-mix is provided with too low of a percentage of fluorine, gas replenishment mechanism 30 may be operated to immediately increase the amount of fluorine after chamber 12 is filled with the pre-mix.

As can be appreciated, a wide number of specific embodiments can be employed and various strategies and techniques used, all in accordance with the general principles of the invention.

Despite operation of replenishment 30, it is anticipated that the mixture within chamber 12 will need to be flushed and replaced periodically. Thus, the operation of the replenishment apparatus is not necessarily intended to completely prevent the need to flush the chamber and replace the gasses. Rather, operation of the replenishment mechanism is primarily provided for extending the period between necessary system flushes and for maintaining an optimal mixture during that period.

A method by which the gas mixture within an excimer laser is replenished and maintained is generally illustrated in FIG. 2. Initially, at step 200, a gas chamber of the excimer laser is filled with a pre-mix having a preferably optimal composition of fluorine, krypton and neon. At 102, the excimer laser is activated. Operational parameters of the laser are detected at step 104. The operational parameters may include the energy, frequency and bandwidth of the laser as well as the pulse repetition rate of the laser.

At 106, the system determines a change in the gas mixture causing the change in the operational parameters. Next, at 108, the separate fluorine/krypton/neon and krypton/neon sources and the bleed-down mechanism are controlled to compensate for changes in the gas mixture in an attempt to maintain an optimal mixture. Control of the excimer laser proceeds in a feedback loop denoted by line 110 in FIG. 2. As such, the system continually monitors operational parameters of the laser and controls the separate gas sources and depletion mechanism accordingly to maintain an optimal overall laser efficiency.

FIG. 2, thus, represents a general overview of method steps of the invention. Actual operation of the system may depend on numerous factors, described above, and various gas replenishment strategies may be employed. In particular, the system need not detect actual changes in operational parameters of the system and instead may control gas replenishment using previously determined, empirically-based, replenishment strategies.

What has been described is a method and apparatus for replenishing a gas mixture within an excimer gas laser. The general principles of the invention, although described above with reference to a fluorine/krypton/neon excimer laser, may be applied to other excimer lasers and to other gas lasers as well. In general, principles of the invention may be advantageously exploited in any gas laser system employing two or more separate gas components which are subject to independent depletion. Thus, the exemplary embodiments described herein are merely illustrative of the invention and are not intended to limit the scope of the invention.

I claim:

1. A method for varying a gas mixture within a gas chamber of a gas laser, said gas mixture including a halogen, a first noble gas and a second noble gas, said gas mixture having a desired composition, said method comprising the steps of:

determining a difference between the desired composition and an actual composition of the gas mixture within the gas chamber;

determining a first amount of a halogen, first noble gas, second noble gas mixture that is to be added to the gas chamber, and a second amount of a first noble gas, second noble gas mixture that is to be added to the gas chamber;

selectively pumping said first amount of said halogen, first noble gas and second noble gas mixture into said chamber;

selectively pumping said second amount of said first noble gas and second noble gas mixture into said chamber; and selectively releasing a portion of said gas mixture within said chamber;

with each of the foregoing steps performed by amounts sufficient to adjust an actual composition of said gas mixture within said chamber toward the desired composition.

2. The method of claim 1, wherein further including a step of determining a difference between the desired composition of the gas mixture and the actual composition of the gas mixture by detecting a difference in an operating efficiency of said gas laser from a desired efficiency level.

3. The method of claim 1, wherein said halogen is fluorine, said first noble gas is krypton and said second noble gas is neon.

4. The method of claim 3, wherein said gas mixture of said chamber has a desired composition of about 0.1% fluorine, 1.0% krypton and 98.9% neon.

5. The method of claim 4, wherein said halogen, 1it noble gas and second noble gas mixture has a composition of about 1.0% fluorine, 1.0% krypton and 98% neon.

6. The method of claim 4, wherein said first noble gas and second noble gas mixture has a composition of about 1.0% krypton and 99% neon.

7. A method for varying a gas mixture within a gas chamber of an excimer laser, said gas mixture including fluorine, krypton and neon, said gas mixture having a desired composition of about 0.1% fluorine, 1.0% krypton and 98.9% neon, said method comprising the steps of:

determining a difference between the desired composition and an actual composition of the gas mixture within said chamber;

determining a first amount of a fluorine, krypton, neon mixture that is to be added to the gas chamber, and a second amount of a krypton, neon mixture that is to be added to the gas chamber;

selectively pumping said first amount of said fluorine, krypton and neon gas mixture into said chamber wherein said fluorine, krypton and neon gas mixture has a composition of about 1% fluorine, 1.0% krypton and 98% neon, selectively pumping said second amount of said krypton and neon gas mixture into said chamber wherein said krypton and neon gas mixture has a composition of about 1.0% krypton and 99% neon, and selectively releasing a portion of said gas mixture within said chamber by amounts sufficient to adjust the actual composition of said gas mixture within said chamber toward the desired composition.

8. The method of claim 7, wherein said step of determining a difference between the desired composition and the actual composition of the gas mixture comprises the step of detecting a change in an operating efficiency of said excimer laser from an initial efficiency level.

9. An apparatus for varying a gas mixture within a gas chamber of a gas laser, said gas chamber containing a gas mixture including a halogen, a first noble gas and a second noble gas, with said gas mixture having a desired composition, said apparatus comprising:

first pump means for selectively pumping a halogen, first noble gas and second noble gas mixture into said chamber;

second pump means for selectively pumping a first noble gas and second noble gas mixture into said chamber;

bleed-down means for selectively releasing a portion of said gas mixture within said chamber; and control means for separately controlling operation of said first pump means, said second pump means and said bleed-down means to vary an actual gas composition within said gas chamber toward the desired composition.

10. The apparatus of claim 9, further including means for determining a difference between the desired composition and the actual composition of the gas mixture within said chamber, with said control means operating in response to said determination.

11. The apparatus of claim 10, wherein said means for determining a difference between the desired composition and the actual composition comprises means for detecting a change in an operating efficiency of said gas laser from an initial efficiency level.

12. The apparatus of claim 9, wherein said control means includes an expert system.

13. The apparatus of claim 9, wherein said halogen is fluorine, said first noble gas is krypton and said second noble gas is neon.

14. The apparatus of claim 13, wherein said gas mixture of said chamber has a desired composition of about 0.1% fluorine, 1.0% krypton and 98.9% neon.

15. The apparatus of claim 14, wherein said halogen, first noble gas and second noble gas mixture has a composition of about 1.0% fluorine, 1.0% krypton and 98% neon.

16. The apparatus of claim 14, wherein said first noble gas and second noble gas mixture has a composition of about 1.0% krypton and 99% neon.

17. An apparatus for varying a gas mixture within a gas chamber of an excimer laser, said gas mixture including fluorine, krypton and neon, said gas mixture having a desired composition of about 0.1% fluorine, 1.0% krypton and 98.9% neon, said apparatus comprising:

first pump means for selectively pumping a fluorine, krypton and neon gas mixture into said chamber wherein said fluorine, krypton and neon gas mixture has a composition of about 1.0% fluorine, 1.0% krypton and 98% neon;

second pump means for selectively pumping a krypton/neon gas mixture into said chamber wherein said krypton/neon gas mixture has a composition of about 1.0% krypton and 99% neon;

bleed-down means for selectively releasing a portion of said gas mixture within said chamber; and control means for separately controlling operation of said first pump means, said second pump means and said bleed-down means to vary an actual composition of said gas mixture within said chamber toward the desired composition.

18. The apparatus of claim 17, further including means for determining a difference between the desired composition and the actual composition of the gas mixture within said chamber, with said control means operating in response to said determination.

19. The apparatus of claim 18, wherein said means for determining a difference between the desired composition and the actual composition comprises means for detecting a change in an operating efficiency of said excimer laser from an initial efficiency level.

20. The apparatus of claim 17, wherein said control means includes an expert system.

* * * * *

UNITED STATES PATENT AND TRADEMARK OFFICE
CERTIFICATE OF CORRECTION

PATENT NO. : 5,440,578
DATED : August 8, 1995
INVENTOR(S) : Sandstrom

It is certified that error appears in the above-indentified patent and that said Letters Patent is hereby corrected as shown below:

In Claim 5 in column 8 at lines 58-59 delete
"said halogen, lit noble gas" and insert
--said halogen, first noble gas--

Signed and Sealed this

Thirtieth Day of April, 1996

Attest:

BRUCE LEHMAN

*Attesting Officer*     Commissioner of Patents and Trademarks

REEXAMINATION CERTIFICATE (4187th)

United States Patent [19]

Sandstrom

[11] B1 5,440,578

[45] Certificate Issued Oct. 24, 2000

[54] GAS REPLENISHMENT METHOD AND APPARATUS FOR EXCIMER LASERS

[75] Inventor: Richard L. Sandstrom, Encinitas, Calif.

[73] Assignee: Cymer, Inc., San Diego, Calif.

Reexamination Request:
No. 90/005,023, Jun. 23, 1998

Reexamination Certificate for:
Patent No.: 5,440,578
Issued: Aug. 8, 1995
Appl. No.: 08/093,353
Filed: Jul. 16, 1993

Certificate of Correction issued Apr. 30, 1996.

[51] Int. Cl.[7] ..................................................... H01S 3/22
[52] U.S. Cl. ............................... 372/59; 372/57; 372/58; 372/60; 372/20; 365/185.2
[58] Field of Search .................................. 372/55, 57, 58, 372/59, 60, 20, 29, 32

[56] References Cited

U.S. PATENT DOCUMENTS

| | | |
|---|---|---|
| 4,722,090 | 1/1988 | Haruta et al. . |
| 4,977,573 | 12/1990 | Bittenson et al. . |
| 5,090,020 | 2/1992 | Bedwell . |

FOREIGN PATENT DOCUMENTS

| | | |
|---|---|---|
| 4-334079 | 11/1992 | Japan . |

OTHER PUBLICATIONS

Roddeck, "Increase of the Availability of Laser–Cutting Systems—Supported by an Expert System," *Dependability of Artificial Intelligence Systems* (Daisy–91)/G.H. Schildt, J. Retti (Editors) Elsevier Science Publishers B.V. (North–Holland) 1991.

*Primary Examiner*—Hemang Sanghavi

[57] ABSTRACT

An excimer gas laser using a fluorine/krypton/neon gas mixture is provided with separate fluorine/krypton/neon and krypton/neon gas sources for use in replenishing the gas mixture. A bleed-down mechanism is also provided for draining a portion of the gas mixture from the excimer laser. A control mechanism controls operation of the separate fluorine/krypton/neon and krypton/neon sources and the bleed-down mechanism to selectively vary the gas mixture within the excimer laser to maintain an overall optimal laser efficiency. Preferably, the control system monitors operational parameters of the excimer laser including gain, wavelength, bandwidth and pulse rate, to determine whether the gas mixture within the excimer laser may have changed from an optimal mixture. The control system controls operation of the separate fluorine/krypton/neon and krypton/neon sources to compensate for changes in the operation parameters of the laser to thereby maintain high overall laser efficiency. Alternatively, gas replenishment is controlled subject to predetermined empirically-based gas replenishment strategies.

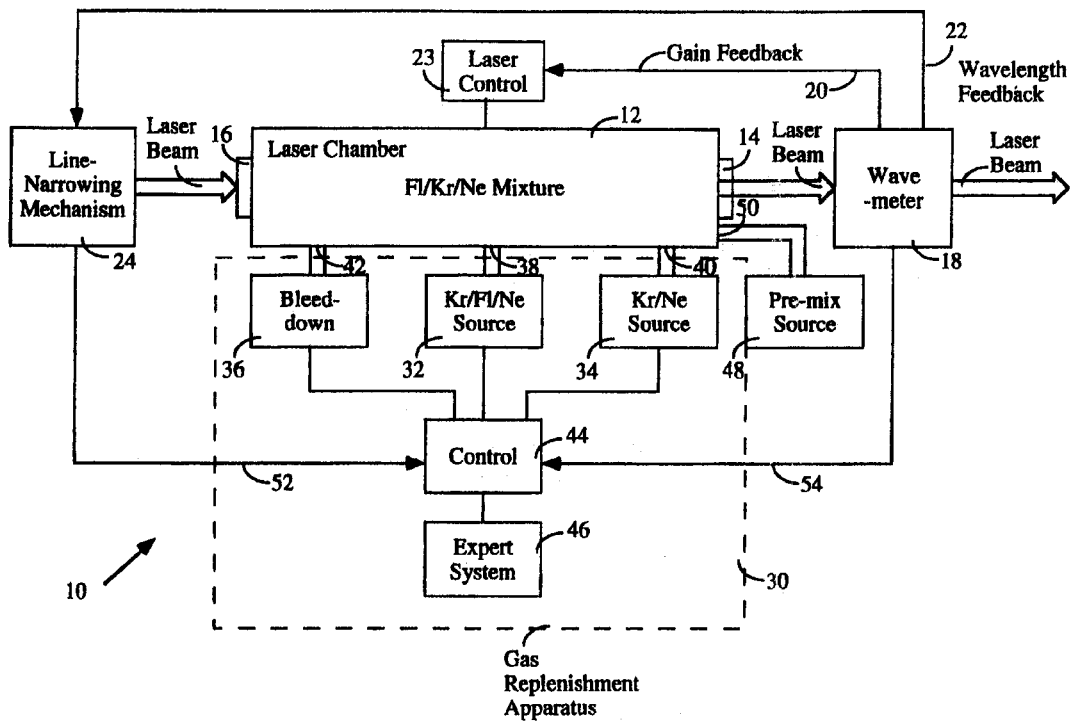

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 43–55:
[On] *One* possible way to correct for depletion of the fluorine in the laser mix is to completely replace the laser mix with a fresh fill containing the correct relative concentrations of gasses. Although a complete replacement of the gas mixture is an effective way to compensate for a deviation in the relative composition of the gasses, such is not a particularly cost effective or efficient method for compensating for gas depletion. Indeed, excimer laser pre-mixes have become quite expensive and, particularly for large scale excimer lasers having considerable gas chamber volume, the cost of completely flushing the gas chamber and replacing it with new gas can be substantial.

Column 2, lines 36–37:
selectively pumping a halogen/first noble gas/second noble [gags] *gas* mixture into said chamber;

AS A RESULT OF REEXAMINATION, IT HAS BEEN DETERMINED THAT:

Claims 10 and 18 are cancelled.

Claims 1–2, 7–9, 11, 17 and 19 are determined to be patentable as amended.

Claims 3–6, 12–16, and 20, dependent on an amended claim, are determined to be patentable.

New claims 21–22 are added and determined to be patentable.

1. A method for varying a gas mixture within a gas chamber of a gas laser, said gas mixture including a halogen, a first noble gas and a second noble gas, said gas mixture having a desired composition, said method comprising the steps of:
   *receiving a first plurality of signals from a wave meter;*
   determining a difference between the desired composition and an actual composition of the gas mixture within the gas chamber *in response to a second plurality of signals including said first plurality of signals*;
   determining a first amount of a halogen, first noble gas, second noble gas mixture that is to be added to the gas chamber, and a second amount of a first noble gas, second noble gas mixture that is to be added to the gas chamber;
   selectively pumping said first amount of said halogen, first noble gas and second noble gas mixture into said chamber;
   selectively pumping said second amount of said first noble gas and second noble gas mixture into said chamber; and
   selectively releasing a portion of said gas mixture within said chamber;
   with each of the foregoing steps performed by amounts sufficient to adjust an actual composition of said gas mixture within said chamber toward the desired composition.

2. The method of claim 1, wherein further including a step of determining a difference between the desired composition of the gas mixture and the actual composition of the gas mixture [by detecting a difference in an operating efficiency of said gas laser from a desired efficiency level] *in response to a parameter measured by said wave meter, said parameter including at least one of a wavelength and a bandwidth*.

7. A method for varying a gas mixture within a gas chamber of an excimer laser, said gas mixture including fluorine, krypton and neon, said gas mixture having a desired composition of about 0.1% fluorine, 1.0% krypton and 98.9% neon, said method comprising the steps of:
   *receiving a first plurality of signals from a wave meter;*
   determining a difference between the desired composition and an actual composition of the gas mixture within [said] *the gas* chamber *in response to a second plurality of signals including said first plurality of signals*;
   determining a first amount of a fluorine, krypton, neon mixture that is to be added to the gas chamber, and a second amount of a krypton, neon mixture that is to be added to the gas chamber;
   selectively pumping said first amount of said fluorine, krypton and neon gas mixture into said chamber wherein said fluorine, krypton and neon gas mixture has a composition of about 1% fluorine, 1.0% krypton and 98% neon, selectively pumping said second amount of said krypton and neon gas mixture into said chamber wherein said krypton and neon gas mixture has a composition of about 1.0% krypton and 99% neon, and selectively releasing a portion of said gas mixture within said chamber by amounts sufficient to adjust the actual composition of said gas mixture within said chamber toward the desired composition.

8. The method of claim 7, wherein said step of determining a difference between the desired composition and the actual composition of the gas mixture comprises the step of detecting a change in [an operating efficiency of said excimer laser from an initial efficiency level] *a parameter measured by said wave meter, said parameter including at least one of a wavelength and a bandwidth*.

9. An apparatus for varying a gas mixture within a gas chamber of a gas laser, said gas chamber containing a gas mixture including a halogen, a first noble gas and a second noble gas, with said gas mixture having a desired composition, said apparatus comprising:
   first pump means for selectively pumping a halogen, first noble gas and second noble gas mixture into said chamber;
   second pump means for selectively pumping a first noble gas and second noble gas mixture into said chamber;
   bleed-down means for selectively releasing a portion of said gas mixture within said chamber;
   *wave meter for producing a signal representative of at least one of a wavelength and a bandwidth;* and
   control means for separately controlling operation of said first pump means, said second pump means and said bleed-down means to vary an actual gas composition within said gas chamber toward the desired composition *in response to a plurality of signals including said signal*.

11. The apparatus of claim [10] *9*, wherein said *control* means [for determining] *is responsive to* a difference between the desired composition and the actual composition [comprises means for detecting] *detected by* a change in [an operating efficiency of said gas laser from an initial efficiency level] *the signal*.

17. An apparatus for varying a gas mixture within a gas chamber of an excimer laser, said gas mixture including fluorine, krypton and neon, said gas mixture having a desired composition of about 0.1% fluorine, 1.0% krypton and 98.9% neon, said apparatus comprising:

first pump means for selectively pumping a fluorine, krypton and neon gas mixture into said chamber wherein said fluorine, krypton and neon gas mixture has a composition of about 1.0% fluorine, 1.0% krypton and 98% neon;

second pump means for selectively pumping a krypton/neon gas mixture into said chamber wherein said krypton/neon gas mixture has a composition of about 1.0% krypton and 99% neon;

bleed-down means for selectively releasing a portion of said gas mixture within said chamber;

*wave meter for producing a signal representative of at least one of a wavelength and a bandwidth; and* control means for separately controlling operation of said first pump means, said second pump means and said bleed-down means to vary an actual composition of said gas mixture within said chamber toward the desired composition *in response to a plurality of signals including said signal*.

19. The apparatus of claim [18] *17*, wherein said *control* means [for determining] *is responsive to* a difference between the desired composition and the actual composition [comprises means for detecting] *detected by* a change in [an operating efficiency of said excimer laser from an initial efficiency level] *the signal*.

21. An apparatus for varying a gas mixture within a gas chamber of a gas laser, said gas chamber containing a gas mixture including a halogen, a first noble gas and a second noble gas, with said gas mixture having a desired composition, said apparatus comprising:

first pump means for selectively pumping a halogen, first noble gas and second noble gas mixture into said chamber;

second pump means for selectively pumping a first noble gas and second noble gas mixture into said chamber;

bleed-down means for selectively releasing a portion of said gas mixture within said chamber;

control means for separately controlling operation of said first pump means, said second pump means and said bleed-down means to vary an actual gas composition within said gas chamber toward the desired composition; and an expert system which maintains a history of said gas laser and optimizes said control means responsive to said history.

22. An apparatus for varying a gas mixture within a gas chamber of an excimer laser, said gas mixture including fluorine, krypton and neon, said gas mixture having a desired composition of about 0.1% fluorine, 1.0% krypton and 98.9% neon, said apparatus comprising:

first pump means for selectively pumping a fluorine, krypton and neon gas mixture into said chamber wherein said fluorine, krypton and neon gas mixture has a composition of about 1.0% fluorine, 1.0% krypton and 98% neon;

second pump means for selectively pumping a krypton/neon gas mixture into said chamber wherein said krypton/neon gas mixture has a composition of about 1.0% krypton and 99% neon;

bleed-down means for selectively releasing a portion of said gas mixture within said chamber;

control means for separately controlling operation of said first pump means, said second pump means and said bleed-down means to vary an actual composition of said gas mixture within said chamber toward the desired composition; and an expert system which maintains a history of said excimer laser and optimizes said control means responsive to said history.

* * * * *